March 21, 1939.  G. H. ACKER  2,151,493

VALVE CONTROL UNIT

Filed March 10, 1937  2 Sheets-Sheet 1

INVENTOR.
George H. Acker
BY
Ray, Oberlin & Ray
ATTORNEYS.

March 21, 1939.  G. H. ACKER  2,151,493

VALVE CONTROL UNIT

Filed March 10, 1937  2 Sheets-Sheet 2

INVENTOR.
George H. Acker
BY
Fay, Oberlin & Fay
ATTORNEYS.

Patented Mar. 21, 1939

2,151,493

UNITED STATES PATENT OFFICE 2,151,493

VALVE CONTROL UNIT

George H. Acker, Shaker Heights, Ohio, assignor to The Cleveland Worm & Gear Company, Cleveland, Ohio, a corporation of Ohio Application March 10, 1937, Serial No. 130,141

5 Claims. (Cl. 192—150)

The present invention relates to a power driven mechanism for operating valves wherein the opening and closing action of the valve element, such as a gate or a disc, is dependent upon the movement of a valve stem.

A valve control unit of the character to which my invention pertains consists essentially of a drive motor, a reduction gear train and electric control switches actuated by forces and movements of the gear train, and adapted to start and stop the drive motor. The driven shaft of the gear train of such a unit is so connected to the valve stem that its rotation is effective to produce opening and closing movement of the valve stem in the valves. As the valve element such as the gate or disc approaches its closed position in the valve seat, its resistance to movement increases very rapidly, and its amount of further movement is very slight, which means that the power driven valve control unit must be capable of delivering excess torque and then stopping immediately upon the valve closing stroke. Since the moving parts of a power source, such as the shaft and armature of an electric motor develop a substantial kinetic energy during operation, and even after cessation of actuation of such a motor, this kinetic energy must still be absorbed by the other elements of the valve control unit such as the valve, the valve stem, and the reduction gear train.

It is therefore the general object and nature of my invention to provide means for automatically disconnecting the drive motor from the remainder of the mechanism when the valve has reached its proper seated or closed position, so that the kinetic energy of the drive motor will not be applied to the remainder of the mechanism, but can be freely dissipated.

My invention also provides means for insuring the delivery of required torque to the valve operating element during the final stage of the valve closing stroke so as to insure a proper seating of the valve.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figures 1, 2:
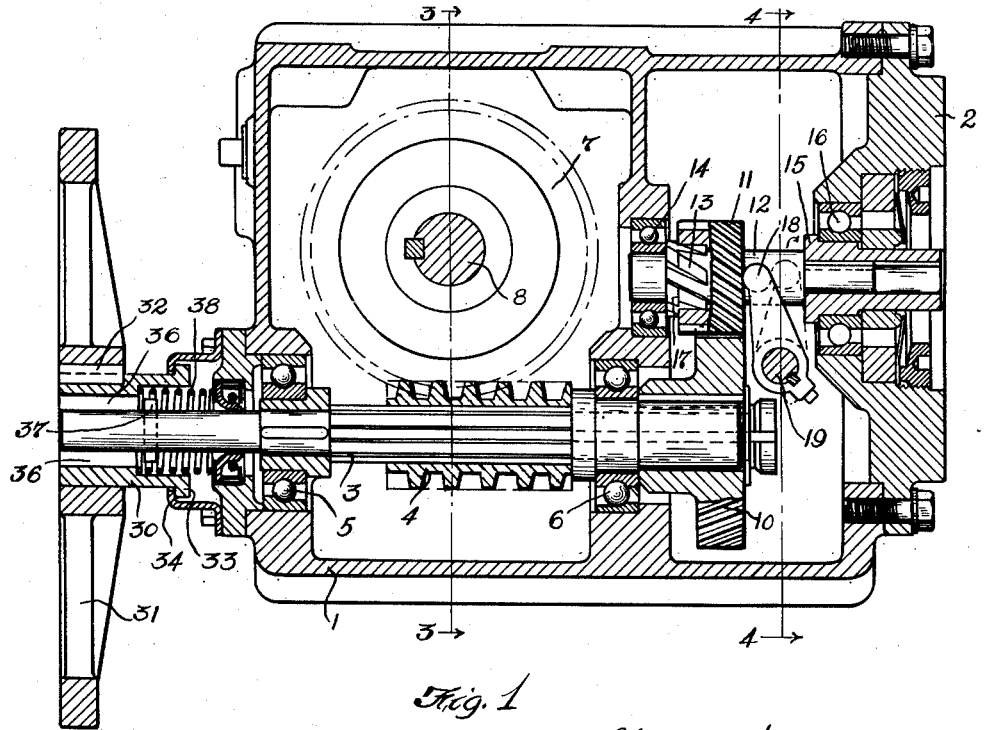
Figure 3:
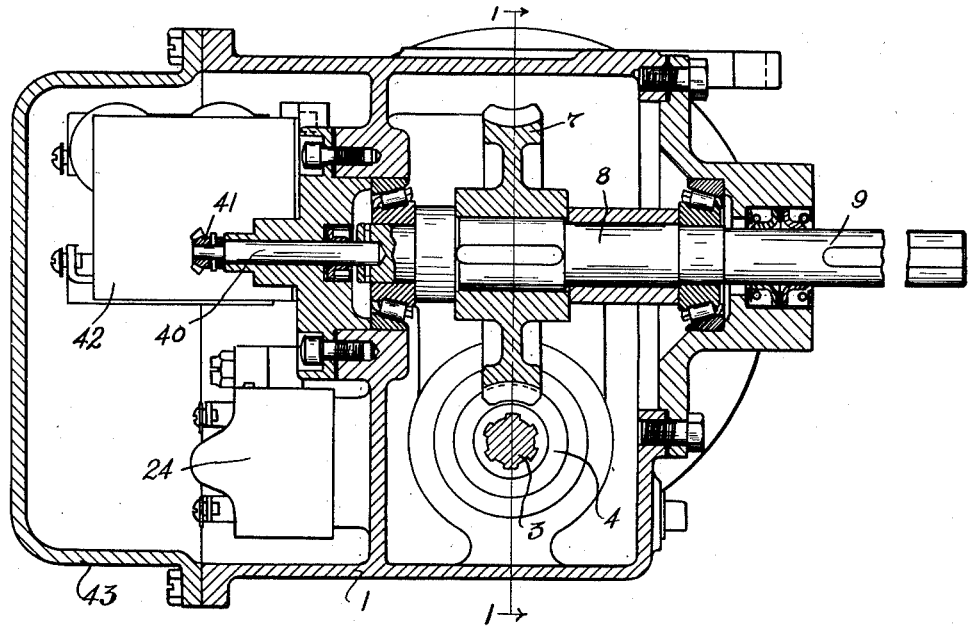
Figure 4:
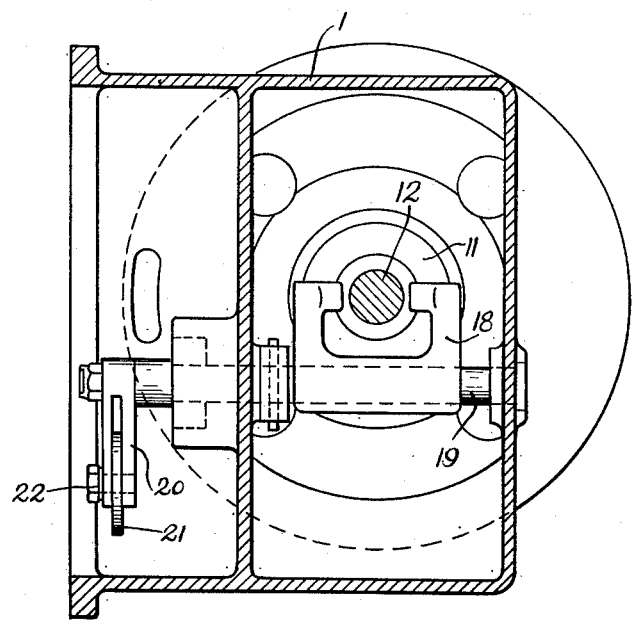

In said annexed drawings:

Fig. 1 is a sectional view of a valve control unit embodying the principle of my invention, such section being taken substantially in the plane of the reduction gear drive shaft; Fig. 2 is a view of the control switch compartment of the valve control unit, and with the cover plate removed; Fig. 3 is a sectional view of the unit taken substantially upon a plane normal to that of Fig. 1 and along line 3—3 thereof; and Fig. 4 is a sectional view, also taken upon a plane normal to that of Fig. 1 and substantially along line 4—4 thereof.

Now referring more particularly to the drawings, the device shown therein includes a housing 1, one end of which is closed by an adapter plate 2 having an external face upon which the drive motor (not shown) is mounted. A worm shaft 3 carrying the worm 4 is journalled in the housing 1 by the bearings 5 and 6. The worm 4 is axially slidable by means of a splined connection with the shaft 3 in order to produce a "hammer blow" effect in the operation of the valve control unit. This latter feature is not claimed as a part of the present invention, since it is more fully set forth, particularly pointed out, and distinctly claimed in my co-pending application Serial No. 123,735, filed Feb. 2, 1937.

A worm wheel 7 keyed to the shaft 8 is driven by the worm 4. The shaft 8 has an exteriorly projecting portion 9 which can be directly connected to a valve stem or indirectly connected to a valve stem nut by means of spur gearing, such nut being carried by the valve yoke. Such latter types of connections are well known in the art and hence are not here illustrated or further described.

A helical gear 10 is mounted on the right hand end of the worm shaft 3, as shown in Fig. 1. The gear 10 meshes with another helical gear 11 carried by the drive shaft 12, and is connected thereto through a helical spline 13. The shaft 12 is journalled at one end in the bearing 14 and its other end is keyed to the coupling sleeve 15 journalled in the bearing 16 mounted in the adapter plate 2. The motor shaft of the drive motor is connected in the outer end of the sleeve 15. The helical spline 13 has an enlarged portion 17 which forms a shoulder for the abutment of the end of the gear 11.

The arms of a fork or yoke 18 bear against the other end of the gear 11 and normally hold it in the position abutting against the shoulder on the helical spline 13.

The yoke 18 is mounted upon a rock shaft 19 which extends into the control switch compartment of the housing 1. An arm 20 is mounted on the end of the shaft 19 and carries the cam 21.

The cam 21 is adjustable to various positions of eccentricity with respect to the arm 20 by means of the clamping stud 22. The cam 21 engages with the end of the plunger 23 which passes through the limit switch 24 and carries a flange 25 against which the compression spring 26 abuts. The other end of the compression spring 26 is mounted within an annular boss 27 in the housing 1, and bears against the threaded adjusting screw 28.

The worm shaft 3 extends to the exterior of the housing 1 and carries on its outer end a hub 30 to which the hand wheel 31 is keyed, as indicated at 32. A flange 33 on the inner end of the hub 30 abuts against an inwardly directed flange 34 on the cup shaped member 35 which is attached to the housing 1. The hub 30 has a pair of slots 36 for the reception of the cross pin 37 carried by the outer end of the shaft 3. A compression spring 38 is mounted between the hub 30 and the housing 1. The hand wheel 31 can thus be connected to the worm shaft 3 by merely pushing it axially inward against the pressure of the spring 38, so that the pin 37 is engaged in the slots 36. The hand wheel 31 of course is provided for emergency, manual operation of the valve control unit.

A control switch drive shaft 40 extends from the inner end of the drive shaft 8 into the control switch compartment, and carries a pinion 41 adapted to be connected in customary manner to the limit switch 42. As shown in Fig. 3, a cover plate 43 is provided for the control switch compartment of the housing 1.

The operation of the above described device is as follows:

Gear 11 is normally connected with the helical spline 13 on the drive shaft 12, as shown in Fig. 1. Assuming that the valve is in open position and that it is to be moved to closed position by rotation of the drive shaft 12, in a direction indicated by the arrow in Fig. 1, or in a counterclockwise direction with respect to Fig. 4, the gear 11 will have a tendency to back off the splines 13, but this tendency is resisted by the arms of the yoke 18. The hand of the helix on the gear 11 is the same as the hand of the helix of the splines 13, so that the helical teeth on the gears 10 and 11 are so disposed as to assist the tendency of the gear 11 to move in a right hand direction along the shaft 12 and to back off from the splines 13. As the valve approaches closed or seated position, its increased resistance to movement is of course transmitted through the shaft 8, the worm gear 7, the worm 4, the shaft 3, the gear 10 to the gear 11 with the resultant increase in the force with which the gear 11 tends to move against the arms of the yoke 18 and incidentally against the pressure of the spring 26. As soon as this resistance is built up to a predetermined value, which is of course the force necessary to produce complete seating of the valve, the pressure of the spring 26 will be overcome and therefore the gear 11 will move to a position out of engagement with the splines 13. The yoke 18, the arm 20 and the cam 21 will of course then assume a position as indicated by the dotted lines in Figs. 1 and 2. Such movement of the parts will move the plunger 23 to such a position as to open the contacts in the switch 24 and thereby deenergize the drive motor. The kinetic energy, or the inertia of the armature and shaft of the drive motor will then be freely dissipated by rotation of the shaft 12, since the gear 11 has been disconnected.

It will be seen that the splines 13 are of limited length, that is, not as long as the teeth of the gear 11, so that the latter can move to disconnected position with respect to the splines 13 without losing mesh or becoming disengaged with the teeth of the gear 10.

When the drive shaft 12 is rotated in an opposite direction, or in a counter-clockwise direction with respect to Fig. 4, for the purpose of again opening the valve, the splines 13 will quickly reengage with the gear 11 and the latter will return to its normal position as shown in Fig. 1. The valve opening operation or stroke of the control unit is of course controlled through the switch 42, so that the drive motor is stopped as the valve approaches fully opened position.

It will thus be seen that my above described invention not only provides means for insuring the seating of the valve under a sufficient pressure, but also disconnects the drive motor after such seating has been obtained, to permit the free rotation of the motor and the dissipation of its kinetic energy so that such energy need not be absorbed through impact resilience of the valve parts and of the gear train.

Other modes of applying the principles of my invention may be employed instead of the one explained, change being made as regards the mechanism herein disclosed, provided the means stated by any of the following claims or the equivalent of such stated means be employed.

I therefore particularly point out and distinctly claim as my invention:

1. In a valve control unit, the combination of power driving means, a rotatable shaft adapted to move the valve to open and closed positions, a reduction gear train connected to said shaft, an axially slidable, helically splined coupling connecting said driving means to said gear train, the length of the spline on said coupling being shorter than the axial movement thereof whereby said spline is movable to disengaged position accordingly to disconnect said driving means.

2. In a valve control unit, the combination of power driving means, a rotatable shaft adapted to move the valve to open and closed positions, a reduction gear train connected to said shaft, an axially slidable, helically splined coupling connecting said driving means to said gear train, the length of the spline on said coupling being shorter than the axial movement thereof whereby said spline is movable to disengaged position accordingly to disconnect said driving means, and yieldable means for resisting the axial movement of said coupling.

3. In a valve control unit, the combination of power driving means, a rotatable shaft adapted to move the valve to open and closed positions, a reduction gear train connected to said shaft, an axially slidable, helically splined coupling connecting said driving means to said gear train, the length of the spline on said coupling being shorter than the axial movement thereof whereby said spline is movable to disengaged position accordingly to disconnect said driving means, yieldable means for resisting the axial movement of said coupling, and control means actuated by axial movement of said coupling for deenergizing said driving means when the latter is disconnected.

4. In a valve control unit, the combination of power driving means, a rotatable shaft adapted to move the valve to open and closed positions, a reduction gear train connected to said shaft, an axially slidable, helically splined coupling connecting said driving means to said gear train, and a helical gear carried by said coupling and engaging at all times with a helical gear in said gear train, the hand of the helix in said first-named helical gear being of the same hand as the helix of the spline of said coupling.

5. In a valve control unit, the combination of power driving means, a rotatable shaft adapted to move the valve to open and closed positions, a reduction gear train connected to said shaft, an axially slidable, helically splined coupling connecting said driving means to said gear train, a helical gear carried by said coupling and engaging at all times with a helical gear in said gear train, the hand of the helix in said first-named helical gear being of the same hand as the helix of the spline of said coupling, and adjustable spring pressure means for resisting the axial movement of said coupling.

GEORGE H. ACKER.